No. 667,406. Patented Feb. 5, 1901.
W. L. SCHELLENBACH.
VARIABLE SPEED GEARING.
(Application filed Mar. 19, 1900.)
(No Model.) 2 Sheets—Sheet 1.
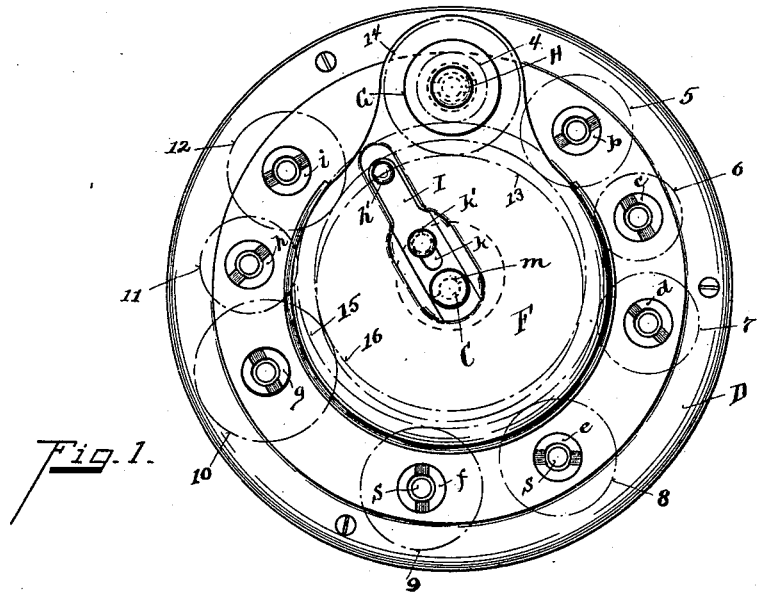
Fig. 1.
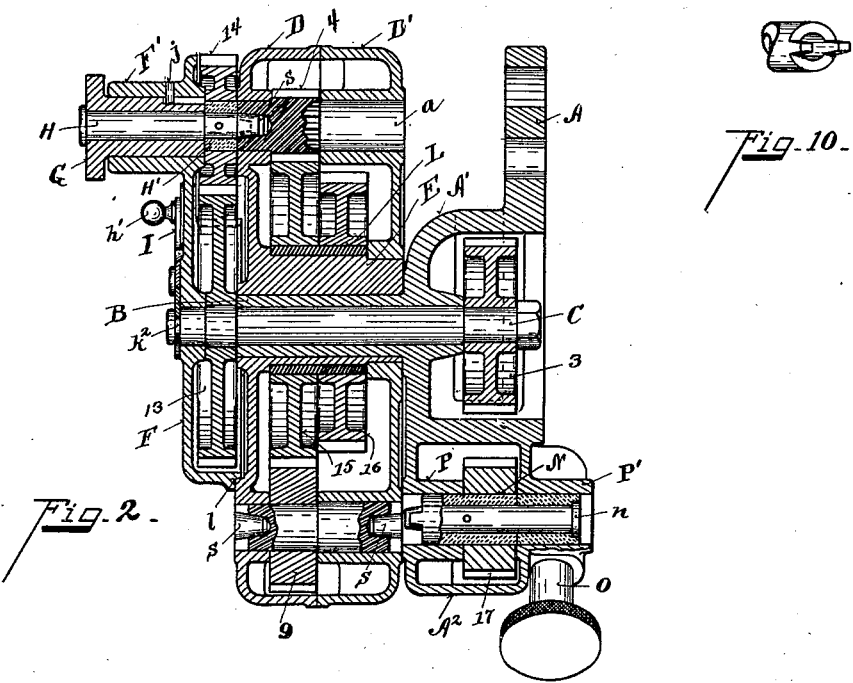
Fig. 2.
Fig. 10.
Witnesses
Oliver B. Kaiser
Edw L. Alexander
Inventor
W. L. Schellenbach
by Wood, Boyd & Wood
Attorneys No. 667,406.  
W. L. SCHELLENBACH.  
VARIABLE SPEED GEARING.  
(Application filed Mar. 19, 1900.)

Patented Feb. 5, 1901.

(No Model.)

2 Sheets—Sheet 2.

Witnesses  
Oliver B. Kaiser  
Edwd L. Alexander

Inventor  
W. L. Schellenbach  
by Wood, Boyd & Wood  
Attorneys

THE NORRIS PETERS CO., PHOTO-LITHO., WASHINGTON, D. C.

UNITED STATES PATENT OFFICE.

WILLIAM L. SCHELLENBACH, OF CINCINNATI, OHIO, ASSIGNOR TO THE NATIONAL MACHINE TOOL COMPANY, OF SAME PLACE.

VARIABLE-SPEED GEARING.

SPECIFICATION forming part of Letters Patent No. 667,406, dated February 5, 1901.

Application filed March 19, 1900. Serial No. 9,209. (No model.)

*To all whom it may concern:*

Be it known that I, WILLIAM L. SCHELLENBACH, a citizen of the United States, residing at Cincinnati, in the county of Hamilton and State of Ohio, have invented certain new and useful Improvements in Variable-Speed Mechanism, of which the following is a specification.

My invention relates to variable-speed devices for engine-lathes and the various classes of machinery acquiring a variety of speeds of the driving power. It is also applicable to counter-shafts generally for effecting the desired range of speeds furnished by the device at that point.

One of the objects of my invention is to so dispose a plurality of speed-changing gears relative to a driving and a driven shaft that by providing suitable mechanism power may be conveyed between said shafts through any selected one or two of said gears, and that when any two particular gears are selected they shall transmit power through an intermediate common to the entire series, whereby a possible speed range is obtained equal to the square of the number of gears involved in the series.

Another object of my invention is to provide a support for such variable-speed devices adapted to be clamped to the frame of any machine to which it may be desired to impart a variety of speeds.

Another object of my invention is to provide reversing devices as a part of the variable-speed device.

Another object of my invention is to provide simple and convenient means of supporting the several parts.

Another object of my invention is to provide quick-shifting means for effecting the different gear and shaft engagements and disengagements.

Further details of my invention will be more particularly set forth in the description of the accompanying drawings, forming a part of this specification, in which—

Figure 3:
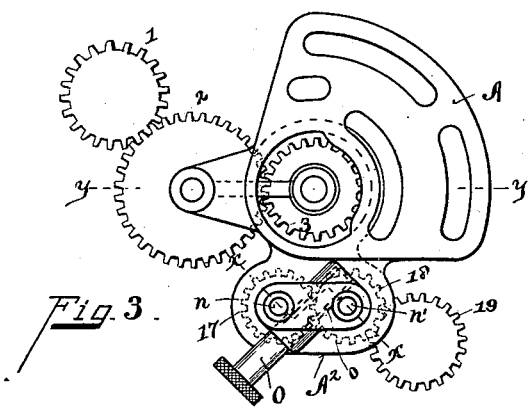
Figure 4:
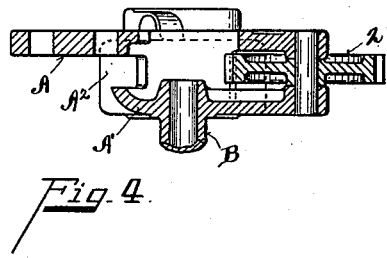
Figure 9:
Figure 5:
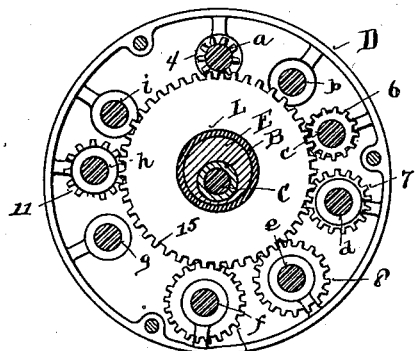
Figure 6:
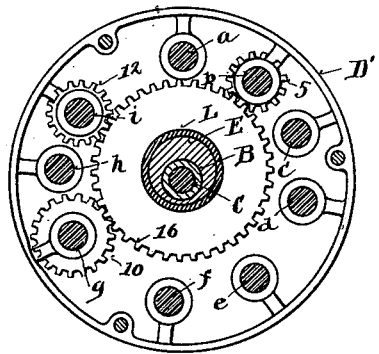
Figure 7:
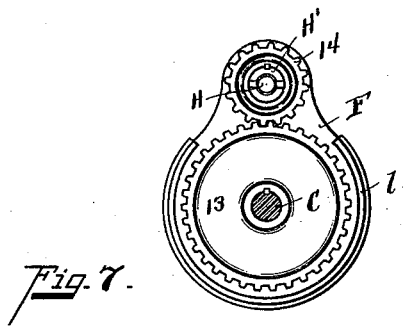
Figure 8:
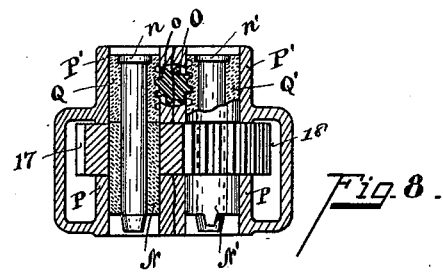

Figure 1 is a face view of my improvement, showing diagram of mounting the gears. Fig. 2 is a central vertical section. Fig. 3 is an end elevation of the supporting-housing. Fig. 4 is a section on line $y\ y$, Fig. 3. Figs. 5 and 6 are inside face views of the respective halves of the housing, showing the disposition of gears in each half. Fig. 7 is a detail view of the independent rotating arm with its gears. Fig. 8 is a section on line $xx$, Fig. 3. Fig. 9 is a perspective view of one of the operating-knurls. Fig. 10 is a perspective view of the clutch member of one of the sleeves.

A represents the main frame or support adapted to be clamped to the ordinary headstock of a lathe or the base or frame of other machines to which my invention is applicable. It is obvious that the shape of this plate may be variously arranged to fit it to the many uses contemplated of this invention. In the form shown in the drawings it is designed to be applied to the head-stock of an ordinary engine-lathe. To this end at A', as shown in Fig. 2, the frame A is outwardly curved, forming a housing for the driving gear-wheel and driven and reversing mechanism to be hereinafter more fully explained.

1 represents the driving-gear of the machine to which my improvement is attached. (See Fig. 3.) 2 represents an intermediate meshing therewith and suitably journaled on frame A. The frame A is provided with the hub B, extended outward laterally and forming a journal for the speed-changing devices and a sleeve through which projects the driving stud-shaft C, fixed to the gear 3 at its inner end within the housing A' on the main frame A. A housing is rotatably journaled upon the hub B and preferably consists of the two-part housing D D', forming opposing abutting sections bolted together. The housing D has an inwardly-extended sleeve-hub E, upon which seats the section D', so that both revolve as a unit upon the hub B. Concentrically disposed around the shaft C and hub B within the housing are the stud-shafts $a\ b\ c\ d\ e\ f\ g\ h\ i$, extending through the faces of sections D D' of the housing and journaling at each end in bearings formed in said faces, the respective housing-faces being bored for this purpose. Each end of each shaft forms a clutch member. Fixed to said shafts, respectively, within the housing are the speed-changing gear-wheels 4, 5, 6, 7, 8, 9, 10, 11, and 12, nine being shown. The gears 5, 10, and 12 are in a common vertical plane through the housing D' and the remaining gears in a common vertical plane through section D of the housing. The shaft C is projected beyond the housing D D' and hub B, and fixed to said end is a gear-wheel 13.

F represents a secondary rotatable gear-support forming a secondary housing centered upon the end of shaft C and having the external peripheral bearing in the outer face of the section D formed by the offset $l$. This secondary support may be rotated either in unison with the housing D D' or independently, and the external bearing renders its movement true and avoids lost motion and firmly supports the housing in place. A bearing-sleeve F' is formed in the outer portion of said housing, within which a knurl G is placed. Passing through this knurl centrally is a centering-pin H. Upon said pin, near its inner end, is pinned a collar H'. Splined upon this collar is a gear-wheel 14, meshing with the gear-wheel 13. It is obvious that the secondary support forms a housing for protecting the gear-wheels 13 and 14. This gear-wheel 14 abuts the inner end of bearing-sleeve F' and is disposed just close enough to the face of housing-section D as to clear the same. This centering-pin H passes through the collar and is adapted to enter a centering-recess $s$, formed in the end of each of said shafts $a$ $b$ $c$ $d$ $e$ $f$ $g$ $h$ $i$ centrally. The inner end of the collar H' is a clutch member adapted to fit each of the clutches on the ends of the shafts in the housing opposing said collar. The periphery of the knurl G is cut away, forming a guide-incline, (see Fig. 9,) against which bears the stationary pin $j$, projected through the bearing-sleeve F'. As the knurl G is turned the inclined guide abuts the pin, and collar H' is moved in or out, thus connecting or disconnecting clutch member H' with its engaging gear, according to the direction in which knurl G is turned.

In order to removably support secondary housing F in place, I provide a radially-slidable latch-plate I, having a longitudinal intermediate slot $k$, through which projects a headed pin $k'$, secured to the housing-section F. $h'$ represents a manipulating-knob on said plate. The inner end of this latch-plate has a semicircular notch $m$, fitting the recess $k^2$ on the end of shaft C. It will be seen that the latch-plate may be slid radially on the face of housing-section F to bring the notch $m$ into engagement with recess $k^2$ on shaft C, thus holding the housing F on said shaft in position, and the housing F in turn holding the gears 13 and 14 against the opposing face of the housing-section D.

As the gears 4, 5, 6, 7, 8, 9, 10, 11, and 12 are of different diameters and as their journals must be arranged in a circle concentric to shaft C in order that each may be brought by the rotation of housing D D' into engaging position with a given driven member on the frame A it is obvious that their inner surfaces cannot be in a circle concentric with their journals and that in order to have a common intermediate the inner surfaces of such speed-changing gears 4, 5, 6, 7, 8, 9, 10, 11, and 12 must be arranged in a true circle, which will be eccentric to the circle in which the gear-journals are arranged. It is also clear that the common intermediate must have its periphery tangent to the inner surfaces of said gears, and that consequently the intermediate must have a journal within the housing eccentric to shaft C and hub B and concentric to the circle tangent to the inner surfaces of said gears 4, 5, 6, 7, 8, 9, 10, 11, and 12. This eccentric journal for the intermediate is formed by the external periphery of the sleeve E of housing-section D, being eccentrically supported on the hub B of the frame A. Upon this journal-sleeve E is mounted a sleeve L, pinned to which is the intermediate two-part gear member 15 and 16, pinned together. The member 15 intermeshes with each of the gears 4, 6, 7, 8, 9, and 11, supported in a common plane in the housing-section D, while member 16 meshes with the gear-wheel 5, 10, and 12 in housing-section D'. Thus gear-wheels 15 and 16 form a single common intermediate gear transmitted between the separate gear-wheels of the entire series, so that power may be conveyed between any two of said gear-wheels always through said intermediate.

The housing $A^2$ of the frame A has the double bearing-sleeves P P, projected toward the opposing face of the housing-section D' just sufficiently to allow the housing to clear sleeves in its rotation. Journaled in said sleeves are the clutch-sleeves N N', splined to gears 17 and 18, which are intermeshed. The clutch-sleeves are pinned to the centering-pins $n$ $n'$, passing, respectively, centrally through the same, the inner ends of the sleeves N N' having clutch members adapted to engage the clutch members on the inner ends of the shafts $a$ $b$ $c$ $d$ $e$ $f$ $g$ $h$ $i$. The centering-pins $n$ $n'$ are adapted to enter the centering-recesses $s$, formed in said shafts $a$ $b$ $c$, &c. In order to operate said clutch-sleeves, I place in rear of each, within the sleeves P' P', the rack-sleeves Q Q', having rack-teeth on their inner faces. These rack-sleeves slide in said sleeves P' P' without revolving. The clutch-sleeves are pinned to the centering-pins $n$ $n'$ and the pins headed in the rack-sleeves. Between said rack-sleeves passes an operating-knurl O, having teeth $o$ on its inner end meshing with the rack-teeth of the rack-sleeves Q Q'. It is obvious that as the knurl is turned in either direction the sleeves and pins are slid in opposite directions through gears 17 and 18, to which the sleeves are splined, so that the centering-pins may be brought into and out of engagement with the clutch ends of shafts $a$ $b$ $c$ $d$ $e$ $f$ $g$ $h$ $i$. Gear-wheel 18 meshes with gear 19, the final driven member on the end of the feed-shaft of the machine to which my improvement is attached.

It is clear that with nine gears constituting my speed-changing system the range of possible speeds obtainable is the square of nine gears, making eighty-one changes.

A suitable index (not shown) is conveniently located in my device for properly directing the operator as to the selection of gears and manipulation of parts necessary to obtain all of the range of speed changes furnished by the system.

Mode of operation: Assume that the speed to be imparted from the driving-shaft to the driven is that speed obtainable from the gear 5 alone. The housing D D' is rotated on hub B until gear 5 is brought opposite the gear 17 on the main frame A. The secondary housing F is turned until gear 14 is opposite gear 5, the gear 14 riding on gear 13, keyed to shaft C. The knurl G is then turned until the clutch-sleeve H', turning with gear 14, engages the clutch member in the opposing end of the shaft $b$ on which gear 5 is mounted. The knurl O in the casing $A^2$ is then turned, so that the clutch-sleeve N can be entered into the clutch member on the opposite end of shaft $b$. If it is desired to reverse the direction of that feed, the knurl is turned in the opposite direction, the clutch-sleeve N is withdrawn, the housing D D' is moved on its center until gear 5 is opposite gear 18, and the knurl O is turned in the same direction until clutch-pin N' enters the clutch member in the end of shaft $b$, carrying gear 5, and so adding gear 18 to the train of gears, thus reversing the direction of rotation of gear-wheel 19. If the speed is to be the resultant of two gears—say 5 driver and 6 driven, being in different circles—the secondary housing F is manipulated until the gear-wheel 14 is clutched to the shaft-carrying gear-wheel 5, and the housing D D', and the secondary housing F are moved in unison on their respective centers until the shaft-carrying gear-wheel 6 is opposite the clutch-sleeve N of gear-wheel 17—the driven gear. It is obvious that in that case gear-wheel 5, meshing with intermediate gear 16, pinned to intermediate gear-wheel 15, meshing in turn with gear-wheel 6, will be the members through which the power is conveyed. All the gear-wheels, save the two selected as driver and driven, are revolved by reason of the speed imparted to the common intermediate as idlers independent of each other.

It is obvious that one or more intermediates can be employed as desired, according to the number, size of gears, and size of housing selected for a given use or application of my improvement, and that power is conveyed directly through the ordinary driver, intermediate, and driven gears for the entire range of speeds furnished by my invention. A plurality of driven gears corresponding to gear 17 could be mounted on the housing A concentric to shaft C, if desired, said gears being of different diameters to still greater increase the speed range or for the purpose of driving a plurality of different feed-shafts. It is also obvious that in my device the driving, driven, and reversing parts on the main frame A are securely housed, the speed-changing gear system and their common intermediate are securely housed in housing D D', and the gears 13 and 14 for conveying power from shaft C to any selected one of the speed-changing gears are also housed. Further, the housing D D' is utilized for rotating the speed changers relative to the driven and reversing-gear 17 18, and the housing F is utilized in rotating gear 14 to clutch the driving-shaft to any one of the speed-changer gears 4 5 6, &c. The ready removal and replacement of the several parts give the user further the option of employing interchangeable gear-wheels, so that my device may be put to the special uses incident to different shop practices, which require special pitch-gears for such extra uses. Various methods could also be devised for giving speed to shaft C and imparting the speed to the final driven member without departing from the spirit of my invention.

Having described my invention, I claim—

1. In a variable-speed device, a driving and a driven shaft, a support, a plurality of different-sized gears mounted thereon, an interior intermediate gear intermeshing with each of the first-named gears, and means for respectively connecting said shafts to any selected one or two of said speed-changing gears whereby the possible range of speeds obtainable is equal to the square of the number of gears comprised in the speed-changing series, substantially as specified.

2. In a variable-speed device the combination of a driving-shaft, a rotatable support, a plurality of different-sized gears mounted on said support, an intermediate gear common to all of said gears, a driven shaft, and means for clutching each of said gears to each of said shafts, substantially as specified.

3. In a variable-speed device, the combination of a driving and a driven shaft, a support, a plurality of different-sized gears mounted on said support, an intermediate gear located inside of said first-named gears and intermeshing with each, and means for clutching each of said gears to each of said shafts whereby power may be conveyed between said shafts through any selected two of said gears and their common intermediate transmitter, substantially as specified.

4. In a variable-speed device, the combination of a driving-shaft, a support, a plurality of different-sized gears mounted on said support, an intermediate transmitting-gear carried by said support within a circle formed by the disposition of said first-named gears, and meshing with each, a driven shaft, and means for clutching each of said gears to each of said shafts, whereby each of said gears may be either driver or driven, and the transmitting-gear always intermediate, substantially as specified.

5. In a variable-speed device, the combination of a driving-shaft, a rotatable support, a plurality of different-sized gears journaled on said support concentrically to said shaft, an intermediate gear journaled on said support and having its periphery tangent to the inner surfaces of said gears, each of said gears meshing with said intermediate, a driven shaft and means for clutching each of said gears to each of said shafts, substantially as specified.

6. In a variable-speed device, the combination of a driving-shaft, a support rotatable around the same, a plurality of different-sized gears concentrically journaled on said support, around said shaft, independent of each other, their inner surfaces being arranged in a true circle eccentric to said shaft, an intermediate gear journaled on said support eccentric to said shaft, and concentric to the inner surfaces of said gears, with each of which the said intermediate gear meshes, a driven shaft located in the path of movement of the concentric journals of said first-named gears, and means for connecting any one or two of said gears to said shafts, whereby power may be conveyed through any selected two and their common intermediate, substantially as specified.

7. In a variable-speed device, the combination of a plate adapted to be clamped to the frame of a machine, having an extended sleeve, a driving-shaft extended through the same, a housing provided with a hub journaled on said sleeve, a plurality of different-sized gears concentrically journaled in said housing around said sleeve, the inner surfaces of said gears being arranged in a true circle concentric to said sleeve, the exterior of said hub forming a journal eccentric to said shaft and concentric to the inner surfaces of said gears, an intermediate gear journaled on a support and meshing with each of said gears, a driven shaft, and means for clutching each of said gears to each of said shafts, substantially as specified.

8. In a variable-speed device the combination of a support adapted to be clamped to the frame of a machine, having an extended sleeve through which passes a driving-shaft, a rotatable housing having a hub journaled on said sleeve a plurality of different-sized gears journaled on said housing, an intermediate gear journaled on the hub of said housing separately intermeshing with each of said gears, a driven shaft and means for clutching each of said gears to each of said shafts, substantially as specified.

9. In a variable-speed device, the combination of a driving and a driven shaft, a support rotatable around said shaft, a plurality of different-sized gears journaled on said support concentric to said shaft, the said gears being arranged in different vertical planes, the inner surfaces of the gears common to each plane being arranged in a true circle eccentric to said driving-shaft, an intermediate gear journaled eccentrically to said driving-shaft and concentrically to the inner surfaces of said gear, the said transmitter having teeth arranged in planes corresponding to the planes in which said gears are mounted, and meshing with each of said gears, the teeth being so spaced that the said intermediate gear acts as a transmitter common to all of said gears, and means for clutching each of said gears to each of said shafts, whereby all of said gears may be either driver or driven and the intermediate always a common transmitter to the selected two, substantially as specified.

10. In a variable-speed device the combination of a journal-support, a driving and a driven shaft, a plurality of different-sized gears concentrically journaled on said support, an intermediate gear eccentrically journaled on said support within the first-named gears and intermeshing with each of said gears, said gears being arranged in different vertical planes with their inner surfaces forming true circles concentric to said intermediate, the teeth of said intermediate gear being spaced relative to the respective circles of gears so as to act as a common transmitter between them, and means for clutching each of said gears to each of said shafts, substantially as specified.

11. In a variable-speed device the combination of a driving and a driven shaft, a support rotatable around said driving-shaft, a plurality of different-sized gears journaled on said support concentric to said driving-shaft, a driving-gear keyed to said shaft, a secondary gear-support turning around said shaft, a pinion carried by said secondary support meshing with said keyed gear, said support and pinion being adapted to travel around said shaft and gear, means for clutching said pinion to any one of said first-named gears, said support forming a housing for said driving gear and pinion, the latter-named gears being interchangeable, and means for clutching each of said plurality of gears to the driven shaft, substantially as specified.

12. In a variable-speed device, the combination of a driving-shaft, a housing rotatable around the same, a plurality of gears on said housing, an intermediate carried by said housing inside of said gears, a gear keyed on said shaft, a secondary support independently rotatable around said shaft, a pinion on said support meshing with said gear, the gear and pinion being interchangeable, the secondary support forming a housing for said gear and pinion, means for attaching and detaching said secondary support to and from said shaft, means for clutching any one of said gears on the primary support to the pinion on the secondary support, a driven shaft, and means for clutching any one of said gears on the primary support to said driven shaft, substantially as specified.

13. In a variable-speed device, the combination of a driving-shaft, a support rotatable around the same, a plurality of different-sized gears journaled on said support concentric to said shaft, an intermediate gear journaled on said support inside of said first-named gears and intermeshing therewith, means for clutching each of said plurality of gears to the driving-shaft, a plurality of driven shafts journaled in a circle parallel and concentric to the circle in which the plurality of gears are journaled, and means for clutching each of said gears to each of said shafts, substantially as specified.

14. In a variable-speed device the combination of a driving-shaft, a support rotatable around the same, a plurality of different-sized gears journaled on said support concentric to said shaft, an intermediate composed of one or more gears journaled on said support concentric to the circle formed by the inner surfaces of said plurality of gears, and meshing with each of said gears, means for clutching each of said gears to said driving-shaft, driven shafts located in the radius of movement of said concentrically-disposed plurality of gears, intermeshing gears carried by said two driven shafts, and means for clutching each of said gears to the driving-shaft, and to either one of the driven shafts, whereby power may be transmitted through any selected two of said gears and the common intermediate and the direction of travel regulated at will by means of said clutch mechanism, substantially as specified.

15. In a variable-speed device the combination of a driving-shaft, a support rotatable around the same, a plurality of gears of different size journaled on said support concentric to said shaft, an intermediate gear journaled on said support concentric to a circle formed by the inner surfaces of said gears, and meshing with each, a driven shaft and its gear and a stud carrying reversing-gear meshing with the driven gear, said shaft and stud being located in the circle in which said plurality of gears are journaled, means for clutching any one of said gears to the driving-shaft, and means for clutching any one of said gears to either the driving or reversing members, substantially as specified.

In testimony whereof I have hereunto set my hand.

WILLIAM L. SCHELLENBACH.

Witnesses:
OLIVER B. KAISER,
VIOLA T. GEORGI.